United States Patent
Isaji et al.

(10) Patent No.: US 10,591,930 B2
(45) Date of Patent: Mar. 17, 2020

(54) AUTOMATIC TRAVELING CONTROL APPARATUS AND AUTOMATIC TRAVELING CONTROL SYSTEM

(71) Applicant: DENSO CORPORATION, Kariya, Aichi-pref. (JP)

(72) Inventors: Kazuyoshi Isaji, Kariya (JP); Keiichi Uno, Kariya (JP); Akihiko Yagyu, Kariya (JP); Mariko Seto, Kariya (JP); Masayuki Angata, Kariya (JP); Hitoshi Wada, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 15/560,455

(22) PCT Filed: Mar. 22, 2016

(86) PCT No.: PCT/JP2016/058923
§ 371 (c)(1),
(2) Date: Sep. 21, 2017

(87) PCT Pub. No.: WO2016/152834
PCT Pub. Date: Sep. 29, 2016

(65) Prior Publication Data
US 2018/0074510 A1     Mar. 15, 2018

(30) Foreign Application Priority Data

Mar. 23, 2015 (JP) .................................. 2015-059848
Feb. 24, 2016 (JP) .................................. 2016-033507

(51) Int. Cl.
*G05D 1/02* (2006.01)
*B60W 50/04* (2006.01)
(Continued)

(52) U.S. Cl.
CPC .......... *G05D 1/0276* (2013.01); *B60W 30/00* (2013.01); *B60W 40/09* (2013.01); *B60W 50/04* (2013.01);
(Continued)

(58) Field of Classification Search
CPC ...... B60W 30/00; B60W 40/09; B60W 50/04; B60W 50/14; G05D 1/0061; G08G 1/0968; G08G 1/20
(Continued)

(56) References Cited

FOREIGN PATENT DOCUMENTS

| JP | 2005-67483 A | 3/2005 |
|----|--------------|--------|
| JP | 2007-249477 A | 9/2007 |

(Continued)

*Primary Examiner* — Maceeh Anwari
(74) *Attorney, Agent, or Firm* — Knobbe, Martens, Olson & Bear, LLP

(57) ABSTRACT

An automatic traveling control apparatus includes an automatic traveling control unit, a function determining unit, a first notifying unit, an abnormality detecting unit, and a second notifying unit. The automatic traveling control unit makes an own vehicle automatically travel along a route to a destination. The function determining unit determines whether or not the state of a function used for automatic traveling is normal. The first notifying unit gives notification of the state of the function determined by the function determining unit. The abnormality detecting unit detects an abnormality in the notification of the state of the function by the first notifying unit. The second notifying unit gives a characteristic notification set in advance, when the abnormality detecting unit detects an abnormality in the notification of the state of the function by the first notifying unit and the function determining unit determines that the state of the function is normal.

17 Claims, 13 Drawing Sheets

(51) Int. Cl.
*B60W 50/14* (2012.01)
*B60W 30/00* (2006.01)
*G08G 1/00* (2006.01)
*B60W 40/09* (2012.01)
*G05D 1/00* (2006.01)
*G08G 1/0968* (2006.01)
*G06K 9/00* (2006.01)
*G01C 21/34* (2006.01)
*G01C 21/26* (2006.01)

(52) U.S. Cl.
CPC ........... *B60W 50/14* (2013.01); *G05D 1/0061* (2013.01); *G08G 1/0968* (2013.01); *G08G 1/20* (2013.01); *G01C 21/26* (2013.01); *G01C 21/3407* (2013.01); *G05D 2201/0213* (2013.01); *G06K 9/00845* (2013.01)

(58) Field of Classification Search
USPC .......................................................... 701/23
See application file for complete search history.

(56) References Cited

FOREIGN PATENT DOCUMENTS

| | | |
|---|---|---|
| JP | 2010-128920 A | 6/2010 |
| JP | 2011-111057 A | 6/2011 |
| JP | 2011-227728 A | 11/2011 |
| JP | 2013-84147 A | 5/2013 |
| JP | 2014-153864 A | 8/2014 |

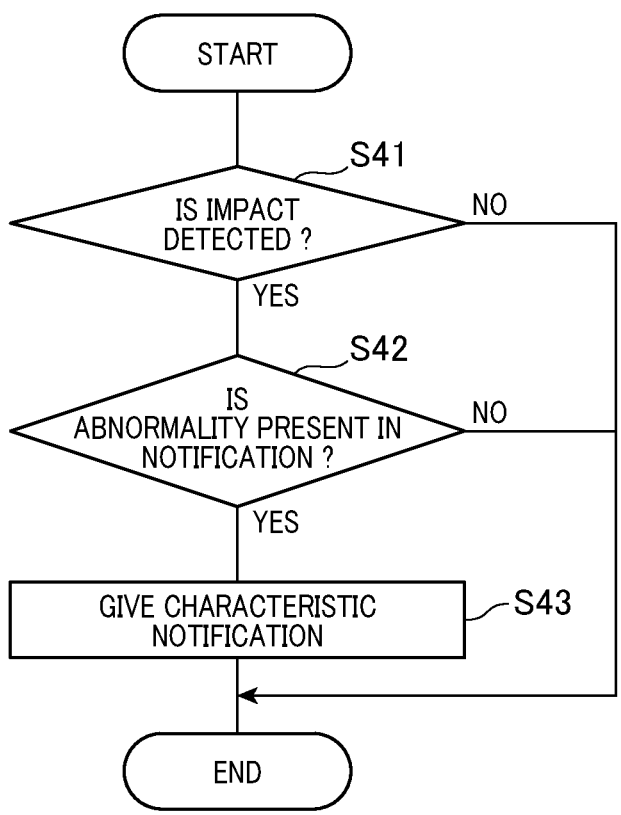

AUTOMATIC TRAVELING CONTROL APPARATUS AND AUTOMATIC TRAVELING CONTROL SYSTEM

CROSS-REFERENCE TO RELATED APPLICATIONS

The present application is based on and claims the benefit of priority from Japanese Patent Application No. 2015-059848, filed on Mar. 23, 2015, and Japanese Patent Application No. 2016-033507, filed on Feb. 24, 2016, the descriptions of which are incorporated herein by reference.

TECHNICAL FIELD

The present disclosure relates to an automatic traveling control apparatus and an automatic traveling control system.

BACKGROUND ART

Conventionally, a technology in which traveling control of an own vehicle is performed based on information from a global positioning system (GPS) satellite is known. For example, in a technology described in PTL 1, information related to traveling control is displayed on a display of an own vehicle and notification is given to a driver.

CITATION LIST

Patent Literature

[PTL 1] JP-A-2005-67483

SUMMARY OF INVENTION

When automatic traveling of an own vehicle is to be performed, notifying a user of whether or not functions used for automatic traveling are normal can be considered, as in the technology described in PTL 1. In this case, when notification cannot be given due to an abnormality in a notifying means, the user experiences concern that an abnormality may be present in the functions used for automatic traveling themselves An object of the present disclosure is to provide an automatic traveling control apparatus and an automatic traveling control system that can solve the above-described issue.

An automatic traveling control apparatus according to an aspect of the present disclosure includes: an automatic traveling control unit that makes an own vehicle automatically travel along a route to a destination; a function determining unit that determines whether or not a state of a function used for automatic traveling is normal; a first notifying unit that gives a notification of the state of the function determined by the function determining unit; an abnormality detecting unit that detects an abnormality in the notification of the state of the function by the first notifying unit; and a second notifying unit that gives a characteristic notification set in advance, when the abnormality detecting unit detects an abnormality in the notification of the state of the function by the first notifying unit and the function determining unit determines that the state of the function used for automatic traveling is normal.

The automatic traveling control apparatus according to an aspect of the present disclosure gives the characteristic notification set in advance, when an abnormality is detected in the notification of the state of the function used for automatic traveling and the state of the function used for automatic traveling is normal. As a result, the user can easily understand the state of automatic traveling, that is, a state in which the function used for automatic travel itself is normal but notification of this information cannot be given.

An automatic traveling control system according to an aspect of the present disclosure includes the above-described automatic traveling control apparatus and a function providing unit that provides the automatic traveling control apparatus with at least a portion of functions for controlling automatic traveling. As a result, the user can easily understand the state of automatic traveling.

BRIEF DESCRIPTION OF DRAWINGS

FIG. 9 is a flowchart showing an impact detection process performed by the automatic traveling control apparatus in the automatic traveling control system according to the first embodiment;

DESCRIPTION OF EMBODIMENTS

Embodiments of the present disclosure will hereinafter be described with reference to the drawings.

<First Embodiment>

First, a first embodiment will be described with reference to FIGS. 1 to 9.

1. Configuration of an Automatic Traveling Control System 1

Figure 1:
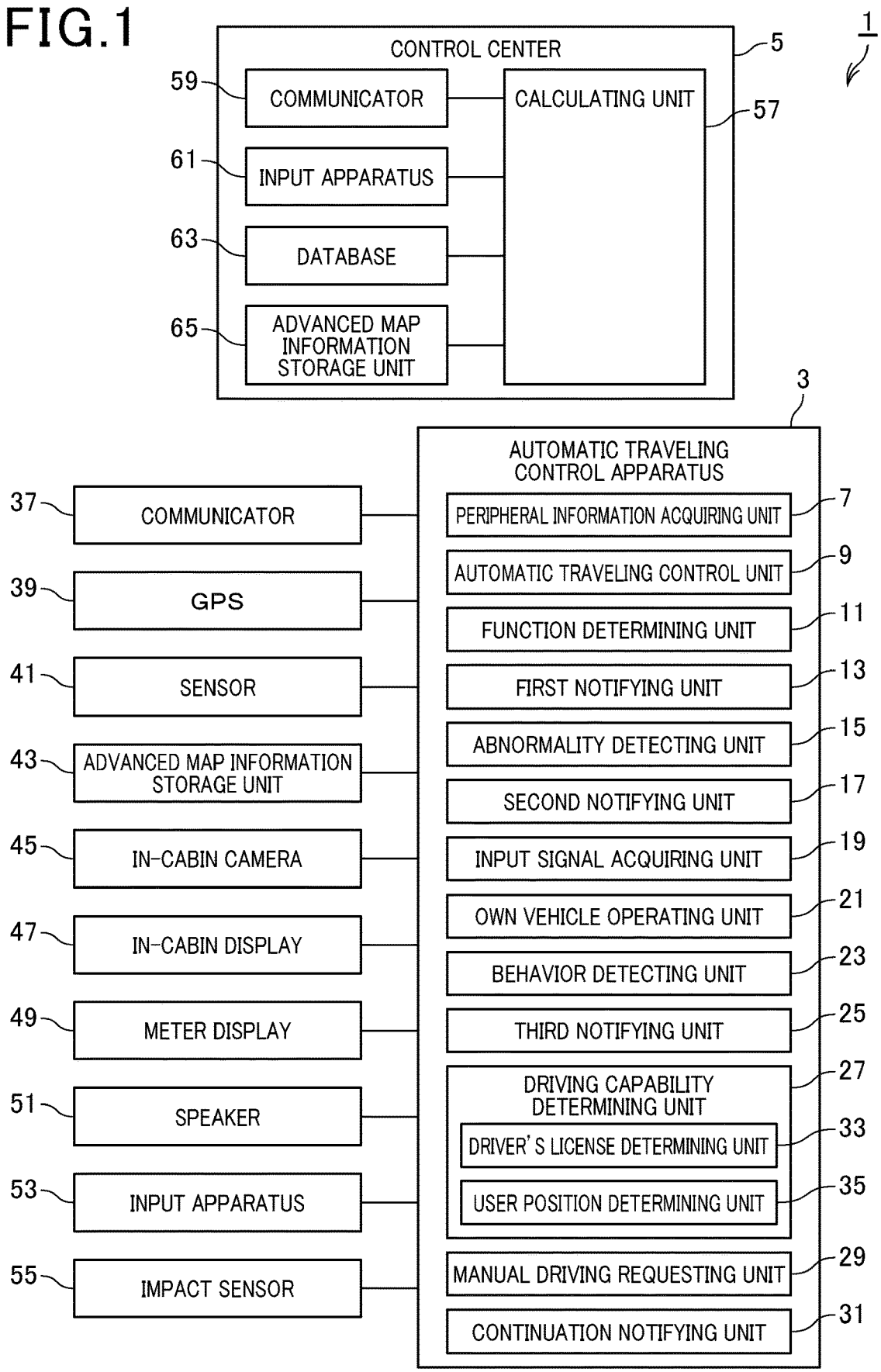
FIG. 1 is a block diagram showing a configuration of an automatic traveling control system according to a first embodiment.

A configuration of an automatic traveling control system 1 according to the present embodiment will be described with reference to FIG. 1. The automatic traveling control system 1 includes an automatic traveling control apparatus 3 and a control center 5.

The automatic traveling control apparatus 3 is an onboard apparatus that is mounted in a vehicle. The vehicle in which the automatic traveling control apparatus 3 is mounted is hereafter referred to as an own vehicle. The automatic traveling control apparatus 3 is a publicly known computer that includes a central processing unit (CPU), a random access memory (RAM), a read-only memory (ROM), and the like. The automatic traveling control apparatus 3 performs processes described hereafter as a result of the CPU running programs stored in the ROM.

The automatic traveling control apparatus 3 functionally includes a peripheral information acquiring unit 7, an automatic traveling control unit 9, a function determining unit 11, a first notifying unit 13, an abnormality detecting unit 15, a second notifying unit 17, an input signal acquiring unit 19, an own vehicle operating unit 21, a behavior detecting unit 23, a third notifying unit 25, a driving capability determining unit 27, a manual driving requesting unit 29, and a continuation notifying unit 31. In addition, the driving capability determining unit 27 includes a driver's license determining unit 33 and a user position determining unit 35. The functions of each unit will be described hereafter.

In addition to the automatic traveling control apparatus 3, the own vehicle includes a communication device 37, a GPS 39, a sensor 41, an advanced map information storage unit 43, an in-cabin camera 45, an in-cabin display 47, a meter display 49, a speaker 51, an input apparatus 53, and an impact sensor 55.

The communication device 37 performs wireless communication with the control center 5. The GPS 39 acquires position information of the own vehicle using a quazi-zenith satellite 39a (see FIG. 4). The sensor 41 is composed of an image sensor, a millimeter-wave radar, a LiDAR (light detection and ranging), or the like. The sensor 41 is capable of detecting a target (such as an obstacle) in the periphery of the own vehicle.

The advanced map information storage unit 43 stores therein advanced map information. The advanced map information includes peripheral environment information in addition to typical map information. For example, as the peripheral environment information, a traveling state (such as position and traveling speed) of another vehicle in the own-vehicle periphery, road conditions (road surface state and construction-in-progress), traffic management information such as traffic regulations, information on traffic conditions such as vehicles and pedestrians, and detailed road management information are included. The peripheral environment information constantly (dynamically) changes.

The in-cabin camera 45 is a camera that captures images of a cabin interior of the own vehicle. The in-cabin display 47 is a display that is provided inside the cabin of the own vehicle. The in-cabin display 47 is capable of displaying images. The meter display 49 is a display that is provided on the dashboard. The meter display 49 is capable of displaying images. The speaker 51 is capable of outputting audio inside the cabin of the own vehicle.

The input apparatus 53 receives an input operation by a user and generates an input signal based on the input operation. For example, the input apparatus 53 can be configured by a push button-type switch, a touch panel, a keyboard, a voice-input apparatus, or the like.

The impact sensor 55 is provided inside a housing of the in-cabin display 47. The impact sensor 55 detects impact applied to the in-cabin display 47. When the user touches the in-cabin display 47, the impact sensor 55 detects the impact at that time. The user touching the in-cabin display 47 is an example of a specific behavior of the user.

The control center 5 controls automatic traveling of a vehicle within a specific area. The control center 5 is a center-type apparatus that is monitored by an operator. The control center 5 includes a calculating unit 57, a communication device 59, an input apparatus 61, a database 63, and an advanced map information storage unit 65.

The calculating unit 57 is a publicly known computer that includes a CPU, a RAM, a ROM, and the like. The calculating unit 57 performs processes described hereafter as a result of the CPU running programs stored in the ROM. The communication device 59 performs wireless communication with the automatic traveling control apparatus 3. The input apparatus 61 is an apparatus that inputs various types of information to the calculating unit 57 based on operations by the operator. For example, as the input apparatus 61, a keyboard, a touch panel, a mouse, and a voice-input apparatus can be used.

The database 63 stores therein position information of vehicles (including the own vehicle) subjected to automatic traveling control and vehicle identifications (IDs) in association. Each vehicle periodically transmits, to the control center 5, information associating the position information of the vehicle and the ID of the vehicle. The control center 5 stores the information in the database 63.

In addition, the database 63 stores therein user ID and attributes (such as whether or not the user holds a driver's license) of the user in association. The user refers to a person who is capable of using (capable of boarding) a vehicle subjected to automatic traveling control. Holding a driver's license refers to the owning driver's license qualifications, regardless of whether or not the person is carrying their driver's license with them at this time. That is, the user is considered to hold a driver's license even when the user is not carrying their driver's license with them and their driver's license is in another location.

The advanced map information storage unit 65 stores therein advanced map information. The content of the advanced map information is as described above. The control center 5 is an example of a function providing unit.

2. Processes Performed by the Control Center 5

Next, processes repeatedly performed by the control center 5 (in particular, the calculating unit 57) every predetermined amount of time will be described with reference to FIG. 2.

Figure 2:
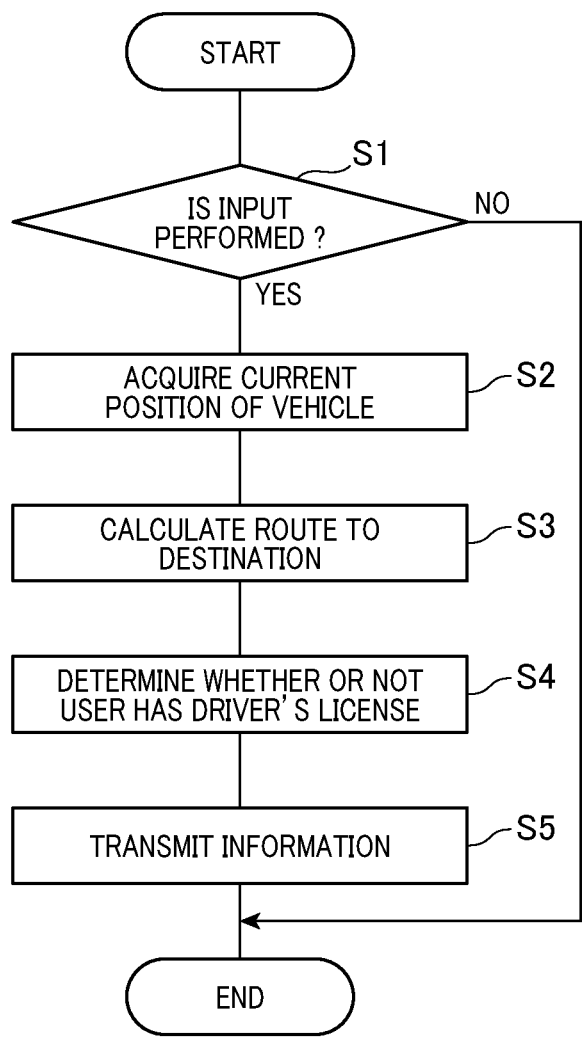
FIG. 2 is a flowchart showing processes performed by a control center in the automatic traveling control system according to the first embodiment.

At step S1 shown in FIG. 2, the calculating unit 57 determines whether or not information has been inputted by the input apparatus 61. The information here refers to the user ID, a current position of the user, a destination, a desired arrival time to the current position of the user (also referred to, hereafter, as simply the desired arrival time), the number of passengers, whether or not the user holds a driver's license, and the like. As a result, when determined that the information has been inputted, the calculating unit 57 proceeds to step S2. When determined that the information has not been inputted, the calculating unit 57 ends the present process.

For example, input of the information can be performed by the operator. For example, the operator can acquire the information to be inputted to the input apparatus 61 in the following manner. First, the user transmits the above-described information to an operator terminal using a mobile terminal or the like belonging to the user. The operator acquires the above-described information from the operator terminal. In addition, the user may directly input the information. For example, the user transmits the above-described information to the control center 5 using a mobile terminal or the like belonging to the user. The control center 5 receives the information using the communication device 59 and inputs the received information to the input apparatus 61. In this case, the process for inputting the information received using the communication device 59 to the input apparatus 61 may be automatically performed or performed with an operation by the operator serving as a trigger.

At step S2, the calculating unit 57 acquires a current position of a vehicle that is on standby from the database 63. Here, on standby refers to a state in which the automatic traveling control apparatus 3 is not performing automatic traveling control and manual driving is also not being performed. When a plurality of vehicles that are on standby are present, the current position of a vehicle closest to the current position of the user is acquired.

At step S3, the calculating unit 57 calculates a route from current position of the vehicle acquired at step S2 to the destination, via the current position of the user inputted at step S1. The advanced map information stored in the advanced map information storage unit 65 is used for the calculation.

At step S4, the calculating unit 57 determines whether or not the user who as the user ID inputted at step S1 holds a driver's license, using the database 63. As described above, the database 63 stores therein the user ID in association with the attributes of the user (including whether or not the user holds a driver's license).

At step S5, the calculating unit 57 transmits information to the automatic traveling control apparatus 3 that is mounted in the vehicle of which the current position has been acquired at step S2, using the communication device 59. The information includes the route calculated at step S3 and the determination result at step S4.

3. Automatic Traveling Start Process Performed by the Automatic Traveling Control Apparatus 3

Next, an automatic traveling start process repeatedly performed by the automatic traveling control apparatus 3 every predetermined amount of time will be described with reference to FIG. 3.

Figure 3:
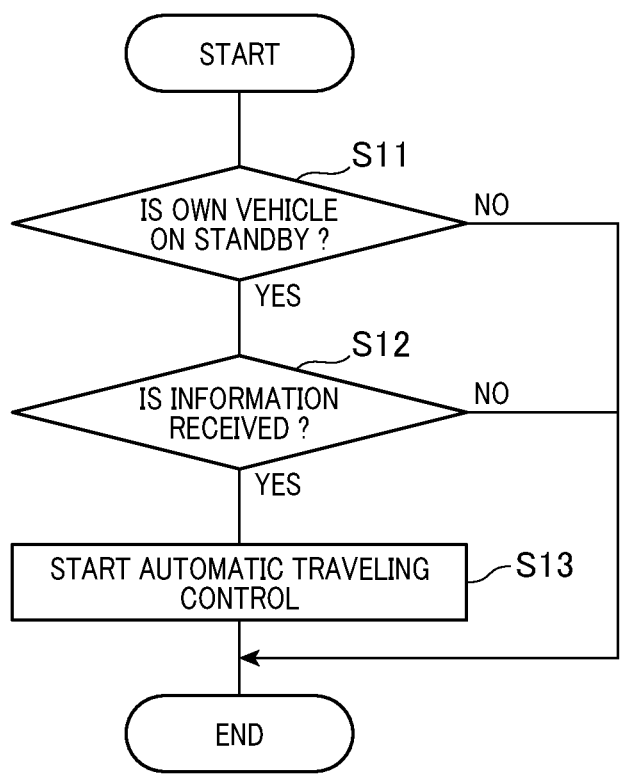
FIG. 3 is a flowchart showing an automatic traveling control start process performed by an automatic traveling control apparatus in the automatic traveling control system according to the first embodiment.

At step S11 shown in FIG. 3, the automatic traveling control apparatus 3 determines whether or not the own vehicle is on standby. As a result, when determined that the own vehicle is on standby, the automatic traveling control apparatus 3 proceeds to step S12 When determined that the own vehicle is not on standby, the automatic traveling control apparatus 3 ends the present process.

At step S12 the automatic traveling control apparatus 3 determines whether or not the information transmitted by the control center at step S5 is received. When determined that the information is received, the automatic traveling control apparatus 3 proceeds to step S13. When determined that the information is not received, the automatic traveling control apparatus 3 ends the present process.

At step S13, the automatic traveling control apparatus 3 starts the automatic traveling control by the automatic traveling control unit 9. The automatic traveling control is control performed to make the own vehicle automatically travel along a route to a destination. The route is included in the information received at step S12. In addition, the automatic traveling control is performed such that the own vehicle arrives at the current position of the user at the desired arrival time included in the information received at step S12.

Figure 4:
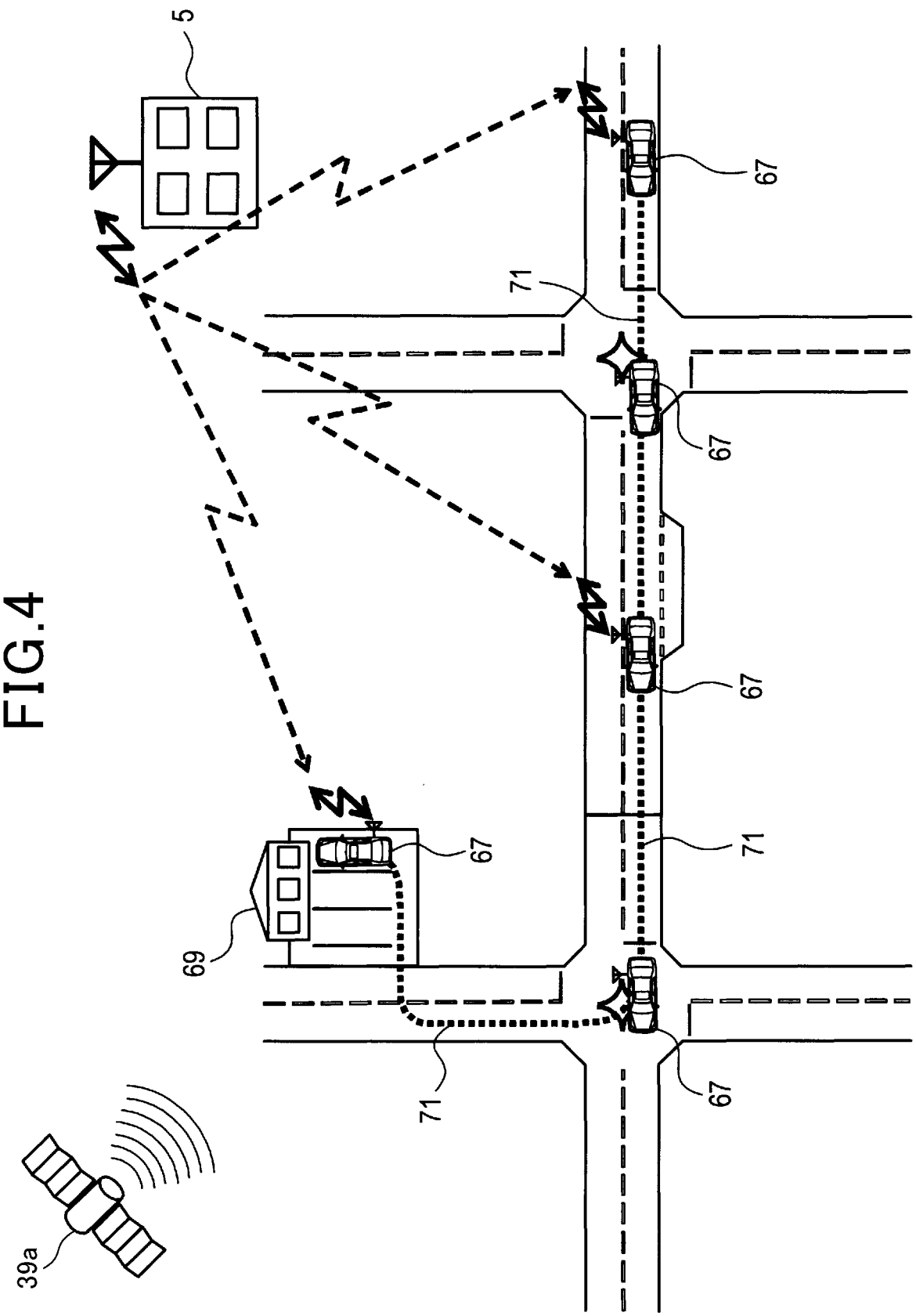
FIG. 4 is an explanatory diagram showing an example of automatic traveling control by the automatic traveling control system according to the first embodiment.

For example, as shown in FIG. 4, an own vehicle 67 automatically travels, by the automatic traveling control unit 9, to a destination 69 along a route 71 that is included in the information transmitted by the control center 5. During the automatic traveling control, the automatic traveling control apparatus 3 periodically transmits the position information of the own vehicle 67 to the control center 5 using the communication device 37. The control center 5 stores the position information of the own vehicle 67 in the database 63.

The method for the automatic traveling control is a publicly known method. Therefore, details thereof are omitted. During the automatic traveling control, the automatic traveling control apparatus 3 periodically acquires the position information of the own vehicle using the GPS 39 and controls traveling of the own vehicle to maintain the position of the own vehicle on the route to the destination, by the automatic traveling control unit 9.

In addition, the automatic traveling control unit 9 performs the automatic traveling control using peripheral information acquired by the peripheral information acquiring unit 7. The peripheral information acquiring unit 7 acquires the peripheral information using the sensor 41. For example, as the peripheral information, whether or not an obstacle is present in the periphery of the own vehicle, a distance from the own vehicle to the obstacle, and an orientation of the obstacle with reference to the own vehicle can be given. During the automatic traveling control, the automatic traveling control unit 9 recognizes an obstacle that may come into contact with the own vehicle, should the own vehicle continue to travel as is, based on the peripheral information. When such an obstacle is present, the automatic traveling control unit 9 performs deceleration, stopping, steering, and the like as appropriate to avoid contact with the obstacle.

In addition, during the automatic traveling control, when an input operation to the input apparatus 53 is performed, the automatic traveling control unit 9 is such that the own vehicle operating unit 21 operates the own vehicle based on the input operation. As the operation of the own vehicle, temporary stopping, starting after temporary stopping, changing destinations, and the like are possible.

4. Notification Abnormality Detection Process Performed by the Automatic Traveling Control Apparatus 3

Next, a notification abnormality detection process repeatedly performed by the automatic traveling control apparatus 3 every predetermined amount of type during the automatic traveling control will be described with reference to FIG. 5.

Figure 5:
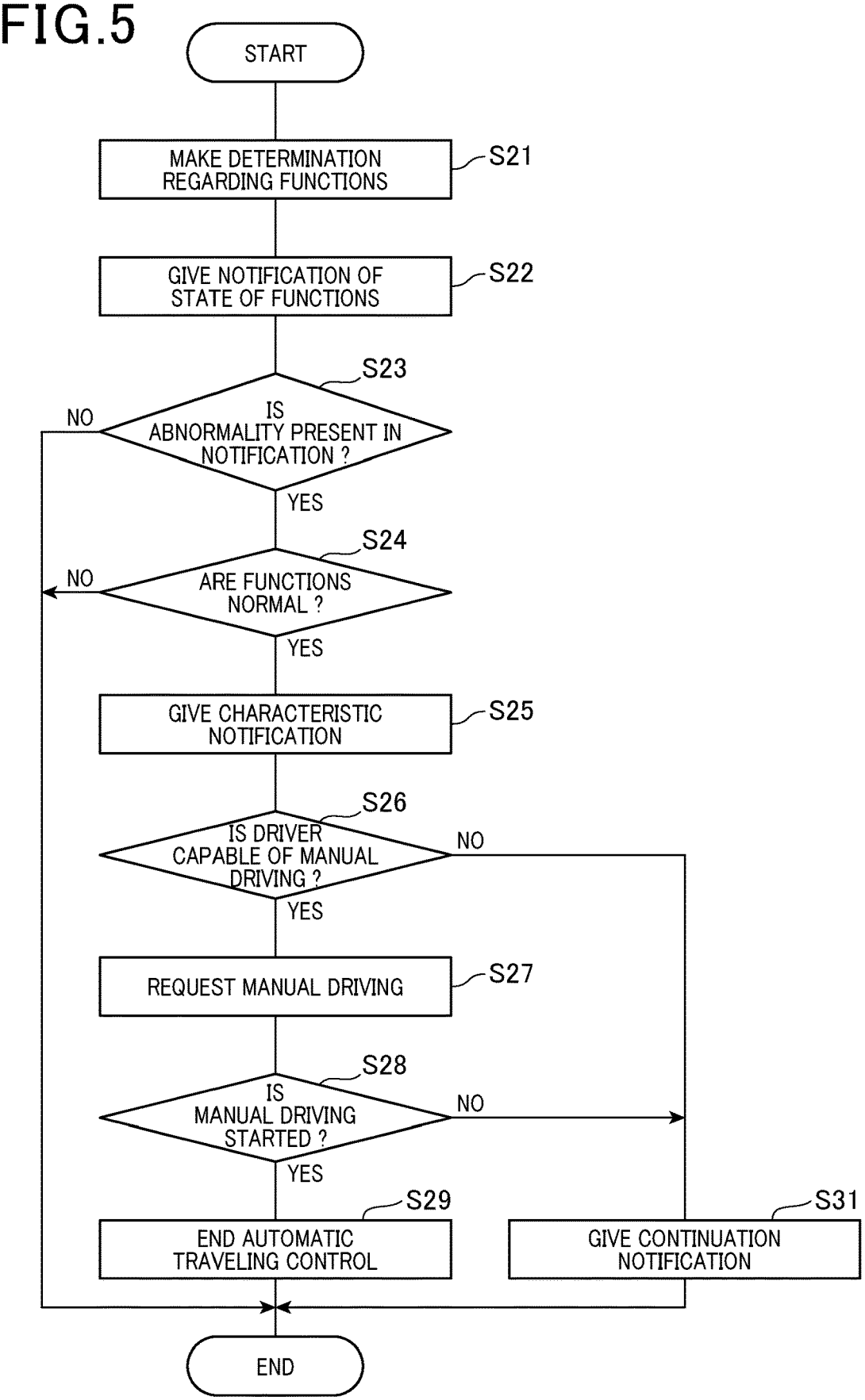
FIG. 5 is a flowchart showing a notification abnormality detection process performed by the automatic traveling control apparatus in the automatic traveling control system according to the first embodiment.

At step S21 shown in FIG. 5, the automatic traveling control apparatus 3 determines, by the function determining unit 11, whether or not functions used for automatic traveling provided by the automatic traveling control apparatus 3 are normal. For example, as the functions used for automatic traveling, there are functions such as (a) a function for communicating with the control center 5, (b) a function for acquiring the position information of the own vehicle using the GPS 39, and (c) a function for acquiring the peripheral information using the sensor 41. According to the present embodiment, an example is given in which the three functions described above are used as the functions used for automatic traveling. However, the functions are not limited thereto. Any function is applicable as long as the function is used for automatic traveling.

At step S22, the automatic traveling control apparatus 3 gives notification, by the first notifying unit 13, of the state of the functions used for automatic traveling (that is, whether or not each of the above-described functions is normal) determined at step S21. Hereafter, this notification is referred to as a function state notification. According to the present embodiment, a mode of the function state notification is a mode in which notification of an image is given through the in-cabin display 47.

Figure 6:
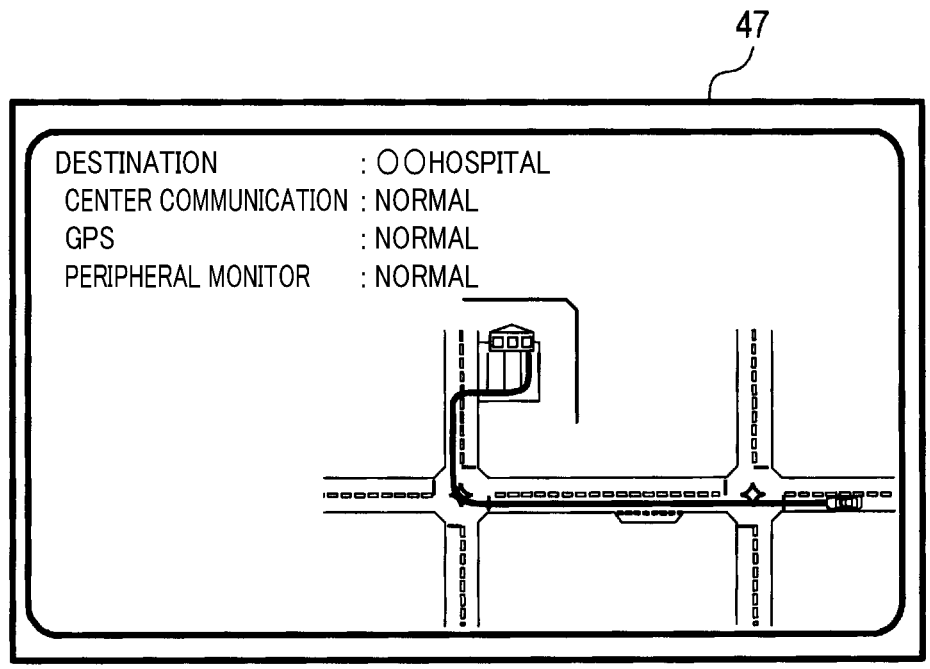
FIG. 6 is an explanatory diagram showing a screen of an in-cabin display when function state notification is normal, in the automatic traveling control system according to the first embodiment.

When the first notification unit 13 and the in-cabin display 47 are normal, for example, a screen shown in FIG. 6 is displayed on the in-cabin display 47. In the display on the in-cabin display 47, "Center communication: Normal" means that the function for communicating with the control center 5 is normal. Meanwhile, when the function for communicating with the control center 5 is abnormal, "Center communication: Abnormal" is displayed on the in-cabin display 47.

On the screen shown in FIG. 6, "GPS: Normal" means that the function for acquiring the position information of the oval vehicle using the GPS 39 is normal. Meanwhile, when the function for acquiring the position information of the own vehicle using the GPS 39 is abnormal. "GPS: Abnormal" is displayed on the in-cabin display 47.

On the screen shown in FIG. 6, "Peripheral monitor: Normal" means that the function for acquiring the peripheral information using the sensor 41 is normal. Meanwhile, when the function for acquiring the peripheral information using the sensor 41 is abnormal, "Peripheral monitor: abnormal" is displayed on the in-cabin display 47.

Figure 7:
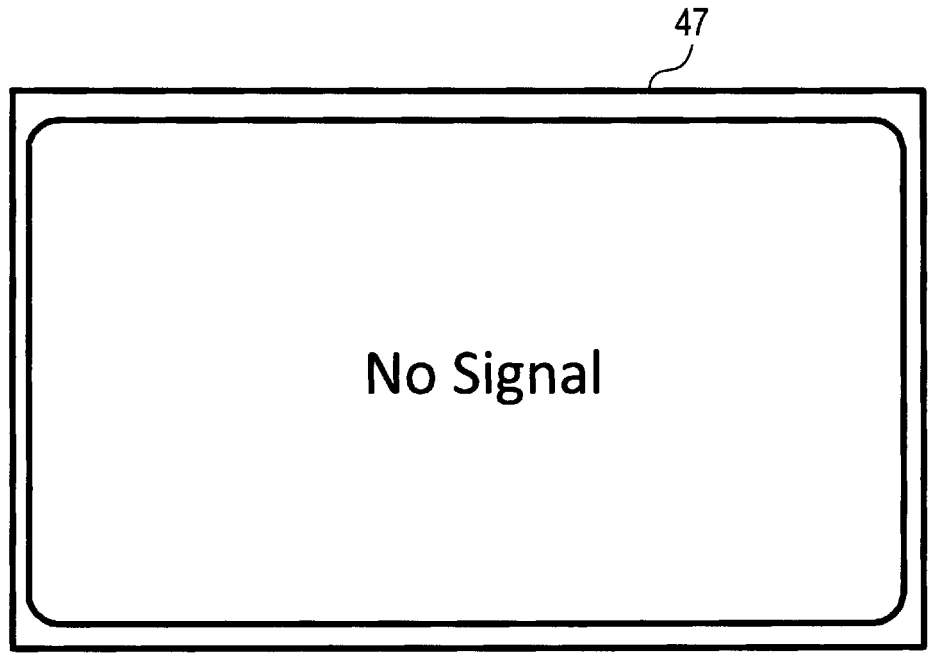
FIG. 7 is an explanatory diagram showing the screen of the in-cabin display when the function state notification is abnormal, in the automatic traveling control system according to the first embodiment.

Meanwhile, when the state of the first notifying unit 13 or the in-cabin display 47 is abnormal, an image is not displayed in the in-cabin display as shown in FIG. 7.

At step S23, the automatic traveling control apparatus 3 determines, by the abnormality detecting unit 15, whether or not an abnormality is present in the function state notification at step S22. Here, an abnormality in the function state notification means that the state of the functions is not correctly displayed on the in-cabin display 47 and, for example, a screen shown in FIG. 7 is displayed. For example, the abnormality detecting unit 15 can detects the abnormality in the function state notification by checking a signal taken from an electronic control unit (ECU) of the in-cabin display 47. As a result, when determined that an abnormality is present in the function state notification, the automatic traveling control apparatus 3 proceeds to step S24. When determined that an abnormality is not present, the automatic traveling control apparatus 3 ends the present process.

At step S24, the automatic traveling control apparatus 3 determines whether or not the determination result of each function at step S21 is normal. As a result, when determined that all functions are normal, the automatic traveling control apparatus 3 proceeds to step S25. When determined at an abnormality is present in even a portion of the functions, the automatic traveling control apparatus 3 ends the present process.

Figure 8A:
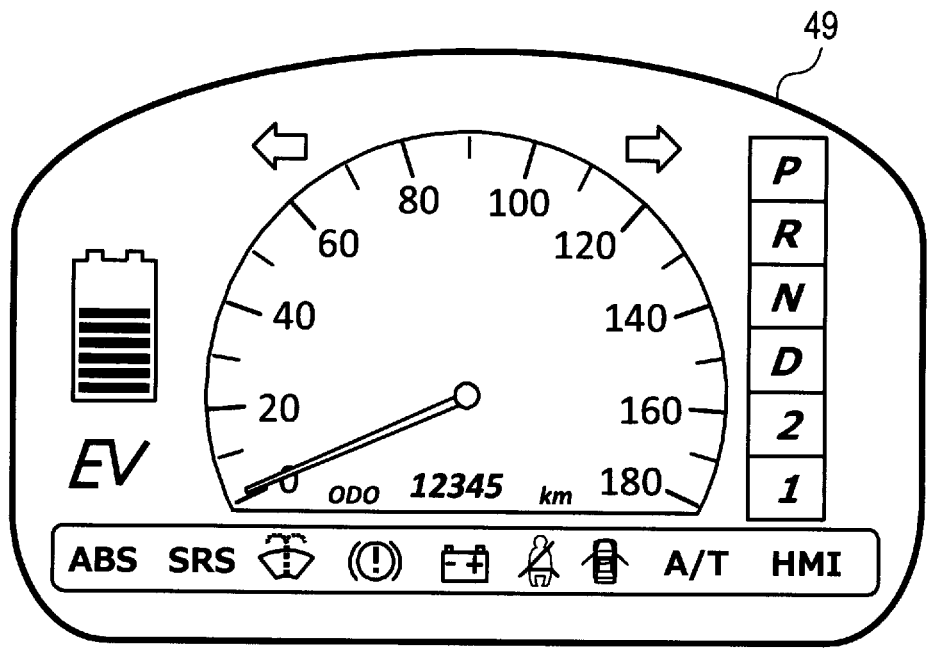
FIG. 8A is an explanatory diagram showing a screen of a meter display when the function state notification is normal, in the automatic traveling control system according to the first embodiment.
Figure 8B:
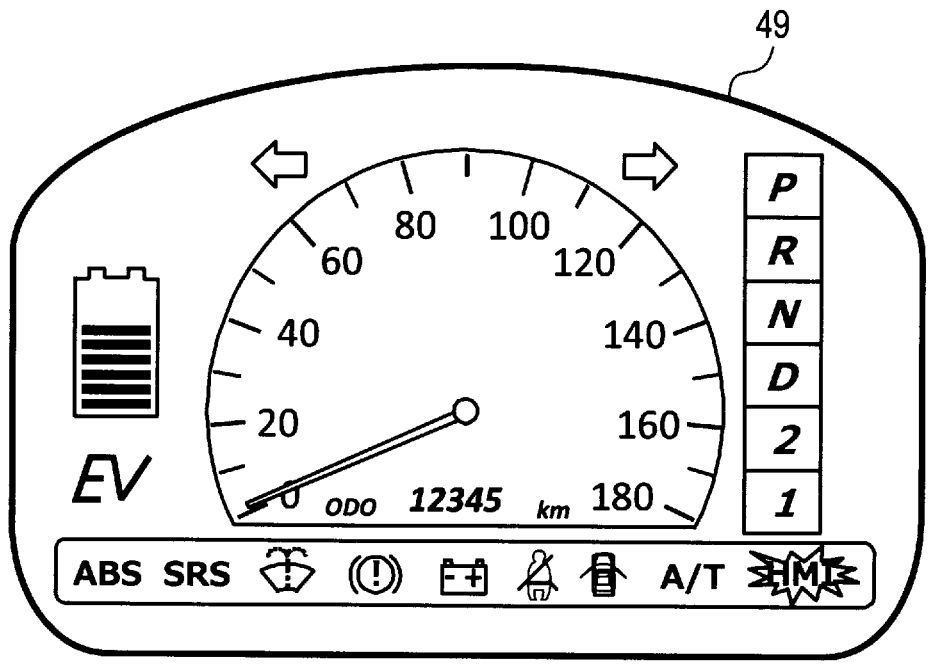
FIG. 8B is an explanatory diagram showing the screen of the meter display when the function state notification is abnormal, in the automatic traveling control system according to the first embodiment.

At step S25, the automatic traveling control apparatus 3 performs a characteristic notification by the second notifying unit 17. The characteristic notification includes a notification by audio and a notification by display of an image. For example, the notification by audio is an output of audio that states, "Monitor malfunction has occurred. Driving will not be affected," using the speaker 51. In addition, for example, the notification by display of an image is characters "HMI" flashing on the meter display 49, as shown in FIG. 8B. As shown in FIG. 8A, the characters "HMI" do not flash on the meter display 49 during ordinary operation (when an abnormality is not present in the function state notification).

At step S26, the automatic traveling control apparatus 3 determines, by the driving capability determining unit 27, whether or not the user on board the own vehicle is capable of manually driving the own vehicle. The determination is made in the following manner. First, the automatic traveling control apparatus 3 determines, by the driver's license determining unit 33 of the driving capability determining unit 27, whether or not the user on board the own vehicle holds a driver's license. The determination is made based on the attributes of the user included in the information received from the control center 5.

Next, the automatic traveling control apparatus 3 determines, by the user position determining unit 35 of the driving capability determining unit 27, whether or not the user on board the own vehicle is present in a position enabling manual driving. Specifically, the automatic traveling control apparatus 3, by the user position determining unit 35, captures an image of the cabin interior of the own vehicle using the in-cabin camera 45, and determines that the user is present in the position enabling manual driving when the user is present in a driver's seat (a position enabling operation of an accelerator, brakes, a steering wheel, and the like). The user is determined to not be present in the position enabling manual driving when the user is not present in the driver's seat.

Then, the automatic traveling control apparatus 3 determines, by the driving capability determining unit 27, that the user on board the own vehicle is capable of manually driving the own vehicle When the user on board the own vehicle holds a driver's license and the user is present in the position enabling manual driving. The automatic traveling control apparatus 3 then proceeds to step S27. Meanwhile, when determined otherwise, the automatic traveling control apparatus 3 determines, by the driving capability determining unit 27, that the user on board the own vehicle is incapable of manually driving the own vehicle, and proceeds to step S31.

At step S27, the automatic traveling control apparatus 3 gives notification, using the manual driving requesting unit 29, requesting manual driving by the user on board the own vehicle. For example, the notification is an output of audio that states, "Please drive manually," using the speaker 51.

At step S28, the automatic traveling control apparatus 3 determines whether or not manual driving has been started within a predetermined amount of time from giving the notification requesting manual driving at step S27. The start of manual driving can be detected by the accelerator, the brakes, the steering wheel, or the like being operated. As a result, when determined that manual driving has been started, the automatic traveling control apparatus 3 proceeds to step S29. When determined that manual driving has not been started, the automatic traveling control apparatus 3 proceeds to step S31.

At step S29, the automatic traveling control apparatus 3 ends the automatic traveling control. From this point onward, the own vehicle travels by manual driving. Meanwhile, when a negative determination is made at step S26 or step S28, the automatic traveling control apparatus 3 proceeds to step S31. The automatic traveling control apparatus 3 gives a continuation notification by the continuation notifying unit 31. For example, the continuation notification is an output of audio that states, "Automatic traveling will be continued," using the speaker 51.

5. Impact Detection Process Performed by the Automatic Traveling Control Apparatus 3

Next, an impact detection process repeatedly performed by the automatic traveling control apparatus 3 every predetermined amount of time during the automatic traveling control will be described with reference to FIG. 9.

At step S41 shown in FIG. 9, the automatic traveling control apparatus 3 determines, by the behavior detecting unit 23, whether or not the impact sensor 55 has detected impact. The impact is that generated when the user strikes the in-cabin display. As a result, when determined that impact is detected, the automatic traveling control apparatus 3 proceeds to step S42. When determined that impact is not detected, the automatic traveling control apparatus 3 ends the present process.

At step S42, in a manner similar to that at step S23, the automatic traveling control apparatus 3 determines, by the behavior detecting unit 23, whether or not an abnormality is present in the function state notification. As a result, when determined that an abnormality is present in the function state notification, the automatic traveling control apparatus 3 proceeds to step S43. When determined that no abnormality is present, the automatic traveling control apparatus 3 ends the present process.

At step S43, the automatic traveling control apparatus 3 performs a notification similar to that at step S25 by the third notifying unit 25. That is, audio that states, "Monitor malfunction has occurred. Driving will not be affected," is outputted using the speaker 51. In addition, as shown in FIG. 8B, the characters "HMI" flash on the meter display 49.

6. Effects Achieved by the Automatic Traveling Control Apparatus 3 and the Automatic Traveling Control System 1

(1A) When an abnormality in the function state notification is detected and the functions used for automatic traveling themselves are normal, the automatic traveling control apparatus 3 performs the characteristic notification in this case. As a result, the user can easily understand the state of automatic traveling (the state in which the functions used for automatic traveling themselves are normal but notification thereof cannot be given)

(1B) Even during the automatic traveling control, the automatic traveling control apparatus 3 can perform operations (such as temporary stopping, starting after temporary stopping, and changing destinations) of the own vehicle based on input operations by the user. In addition, the automatic traveling control apparatus 3 can receive input from the user and more precisely respond to the state in relation to an abnormality.

(1C) When an abnormality is present in the function state notification and the display on the in-cabin display 47 becomes that shown in FIG. 7, the user may strike the in-cabin display 47. At this time, for example, the automatic traveling control apparatus 3 outputs the audio that states, "Monitor malfunction has occurred. Driving will not be affected," and flashes the characters "HMI" on the meter display 49, as shown in FIG. 8B. As a result, the user can know that the reason for which the display on the in-cabin display 47 became that shown in FIG. 7 is an abnormality in the function state notification. In addition, the user can easily understand that the functions for automatic traveling themselves are normal. In addition, input from the user can be received and response to the state in relation to an abnormality can be made more precise.

(1D) The automatic traveling control apparatus 3 performs the automatic traveling control using the advanced map information. As a result, the automatic traveling control can be more appropriately performed.

(1E) During automatic traveling, when an abnormality in the function state notification is detected and the functions used for automatic traveling themselves are normal, in cases in which the user is determined to be capable of manually driving the own vehicle, the automatic traveling control apparatus 3 requests that the user perform manual driving. As a result, safety of the own vehicle is improved.

(1F) The automatic traveling control apparatus 3 includes the driver's license determining unit 33 that determines whether or not the user holds a driver's license and the user position determining unit 35 that determines whether or not the user is present in a position enabling manual driving. When the user who holds a driver's license is present in the position enabling manual driving, the automatic traveling control apparatus 3 determines that the user is capable of manually driving the own vehicle. As a result, whether or not the user is capable of manually driving the own vehicle can he appropriately determined.

(1G) The automatic traveling control apparatus 3 gives notification of the continuation of automatic traveling (a) when manual driving is not started after the manual driving requesting unit 29 gives the notification requesting manual driving by the user, and (b) when the user is determined to be incapable of performing manual driving. As a result, the user can he made to understand the state of the own vehicle.

(1H) The automatic traveling control system 1 includes the control center 5. The control center 5 provides some of the functions for automatic traveling control (performs reception of input information, route calculation, determination of whether or not a driver's license is held, and the like). As a result, processing load placed on the automatic traveling control apparatus 3 can be reduced and the automatic traveling control can be more appropriately performed.

<Second Embodiment>

Next, a second embodiment will be described with reference to FIG. 10.

1. Configuration of the Automatic Traveling Control System 1

The configuration of the automatic traveling control system 1 according to the present embodiment is similar to that according to the first embodiment.

2. Processes Performed by the Automatic Traveling Control Apparatus 3 and the Control Center 5

In the automatic traveling control system 1 according to the present embodiment, the processes performed by the automatic traveling control apparatus 3 and the control center 5 are basically similar to those according to the first embodiment. Therefore, regarding configurations shared with the first embodiment, descriptions thereof are omitted. Differences with the first embodiment will mainly be described.

Figure 10:
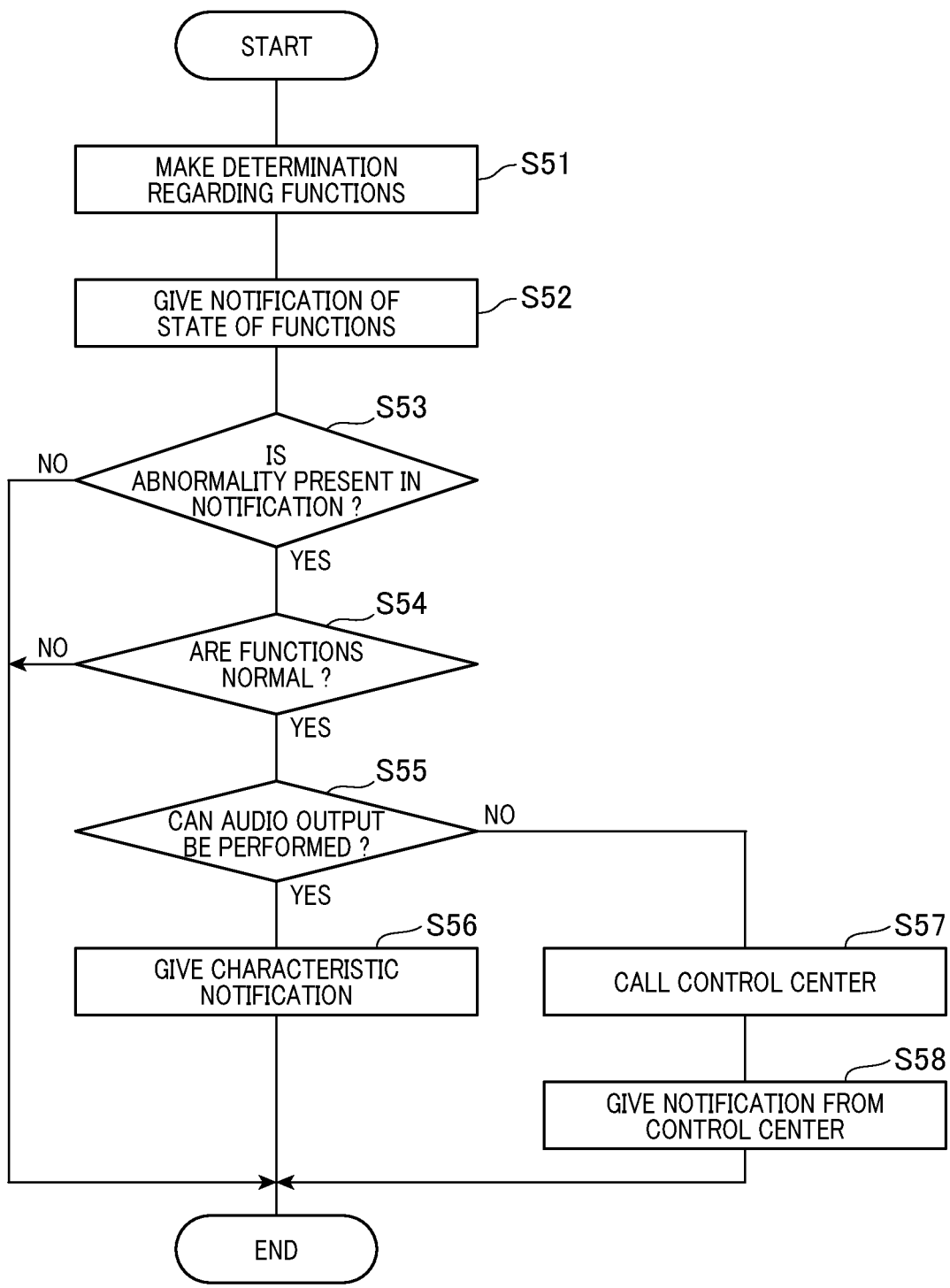
FIG. 10 is a flowchart showing a notification abnormality detection process performed by an automatic traveling control apparatus in an automatic traveling control system according to a second embodiment.

According to the present embodiment, the notification abnormality detection process performed by the automatic traveling control apparatus 3 is as shown in FIG. 10. Processes at steps S51 to S54 are similar to the processes at steps S21 to S24 shown in FIG. 5 according to the first embodiment.

At step S55 shown in FIG. 10, the automatic traveling control apparatus 3 determines whether or not a function for giving notification by audio by the second notifying unit 17 is normal. As a result, when determined that the function is normal, the automatic traveling control apparatus 3 proceeds to step S56. When determined that the function is abnormal, the automatic traveling control apparatus 3 proceeds to step S57.

At step S56, the automatic traveling control apparatus 3 performs the characteristic notification by the second notifying unit 17. The content of the notification is similar to that at step S25 shown in FIG. 5 according to the first embodiment. At step S57, the automatic traveling control apparatus 3 calls the control center 5. In response to the call, the control center 5 transmits an audio signal to the automatic traveling control apparatus 3. For example, the audio signal is a signal of audio that states "Due to monitor and audio malfunction, guidance will be provided by the center. Traveling will not be affected."

At step S58, the automatic traveling control apparatus 3 outputs audio corresponding to the audio signal transmitted at step S27, using the speaker 51.

3. Effects Achieved by the Automatic Traveling Control Apparatus 3 and the Automatic Traveling Control System 1

According to the second embodiment described in detail above, in addition to the above-described effects (1A) to (1D) and (1H) according to the first embodiment, the following effect is achieved.

(2A) Even when the function for audio notification by the second notifying unit 17 is not normal, the automatic traveling control apparatus 3 can perform a similar notification using the control center 5. As a result, the user can easily understand the state of automatic traveling.

<Third Embodiment>

Figure 11:
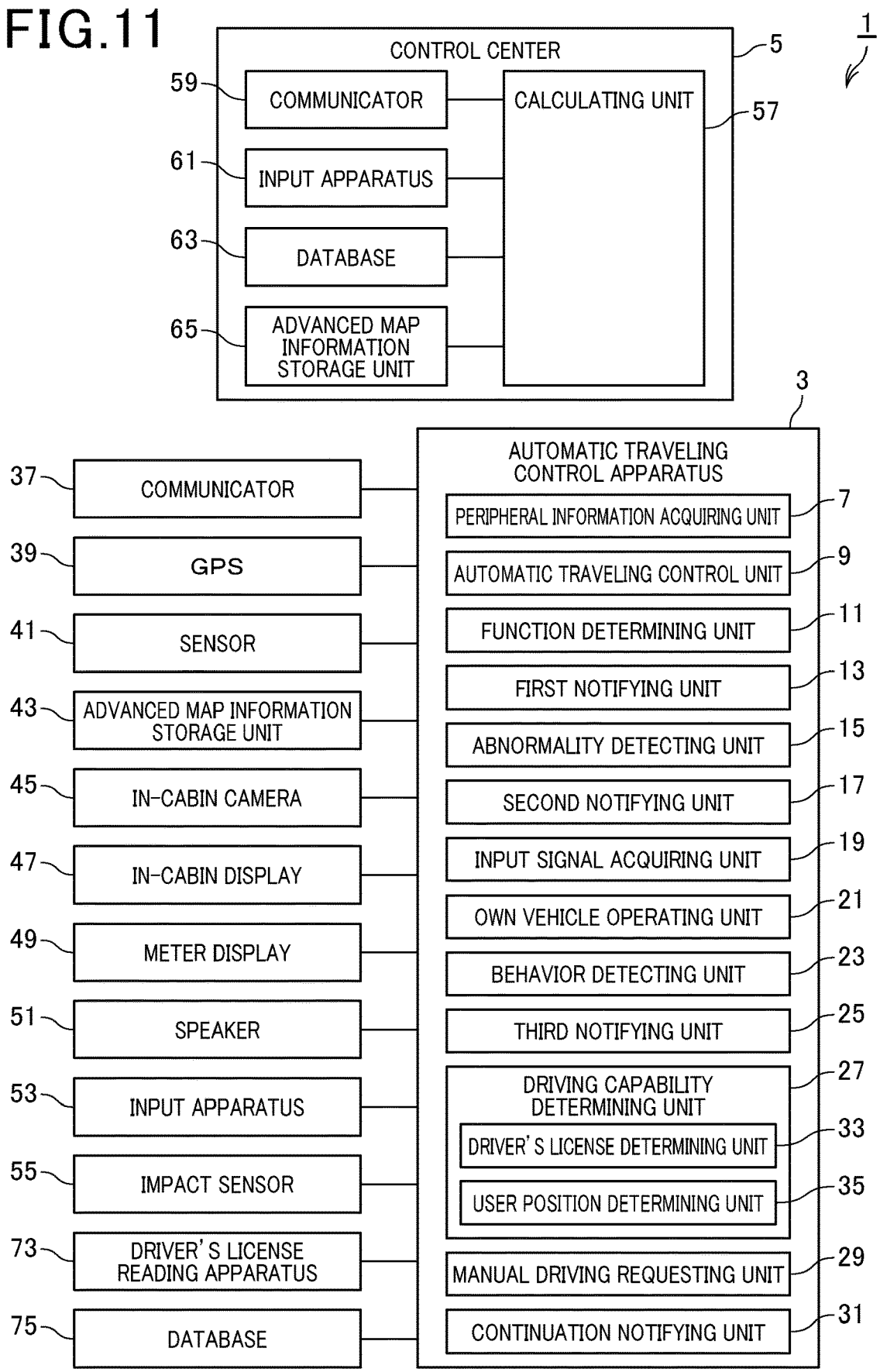
FIG. 11 is a block diagram showing a configuration of an automatic traveling control system according to a third embodiment.

Next, a third embodiment will be described with reference to FIG. 11 and FIG. 12.

1. Configuration of the Automatic Traveling Control System 1

The configuration of the automatic traveling control system 1 according to the present embodiment is basically similar to that according to the first embodiment. However, as shown in FIG. 11, the own vehicle further includes a driver's license reading apparatus 73 and a database 75.

The driver's license reading apparatus 73 is capable of reading identification information of a driver's license when the driver's license is held over the driver's license reading apparatus 73. The identification information is not particularly limited as long as the information differs with each driver's license. For example, as the identification information, a driver's license number, image data of a facial photograph, information stored on an integrated-circuit (IC) chip, can be given.

The driver's license reading apparatus 73 is set near the driver's seat. Therefore, a user who is seated in the driver's seat can easily hold the driver's license over the driver's license reading apparatus 73. Meanwhile, a user who is present in a place other than the driver's seat has difficulty in holding the driver's license over the driver's license reading apparatus 73. The database 75 stores therein the identification information of the driver's license and a facial image of the user holding the driver's license in association.

The driver's license reading apparatus 73 may include a pocket in which the driver's license can be housed. The user can house the driver's license in the pocket. The driver's license reading apparatus 73 can read the identification information from the driver's license that is housed in the pocket.

The database 63 stores therein data (referred to, hereafter, as driver's license validity data) in which whether or not the driver's license is valid is recorded for each piece of identification information of a driver's license.

2. Processes Performed by the Automatic Traveling Control Apparatus 3 and the Control Center 5

According to the present embodiment, the processes performed by the automatic traveling control apparatus 3 and the control center 5 are basically similar to those according to the first embodiment. Therefore, regarding configurations shared with the first embodiment, descriptions thereof are omitted. Differences with the first embodiment will mainly be described.

Figure 12:
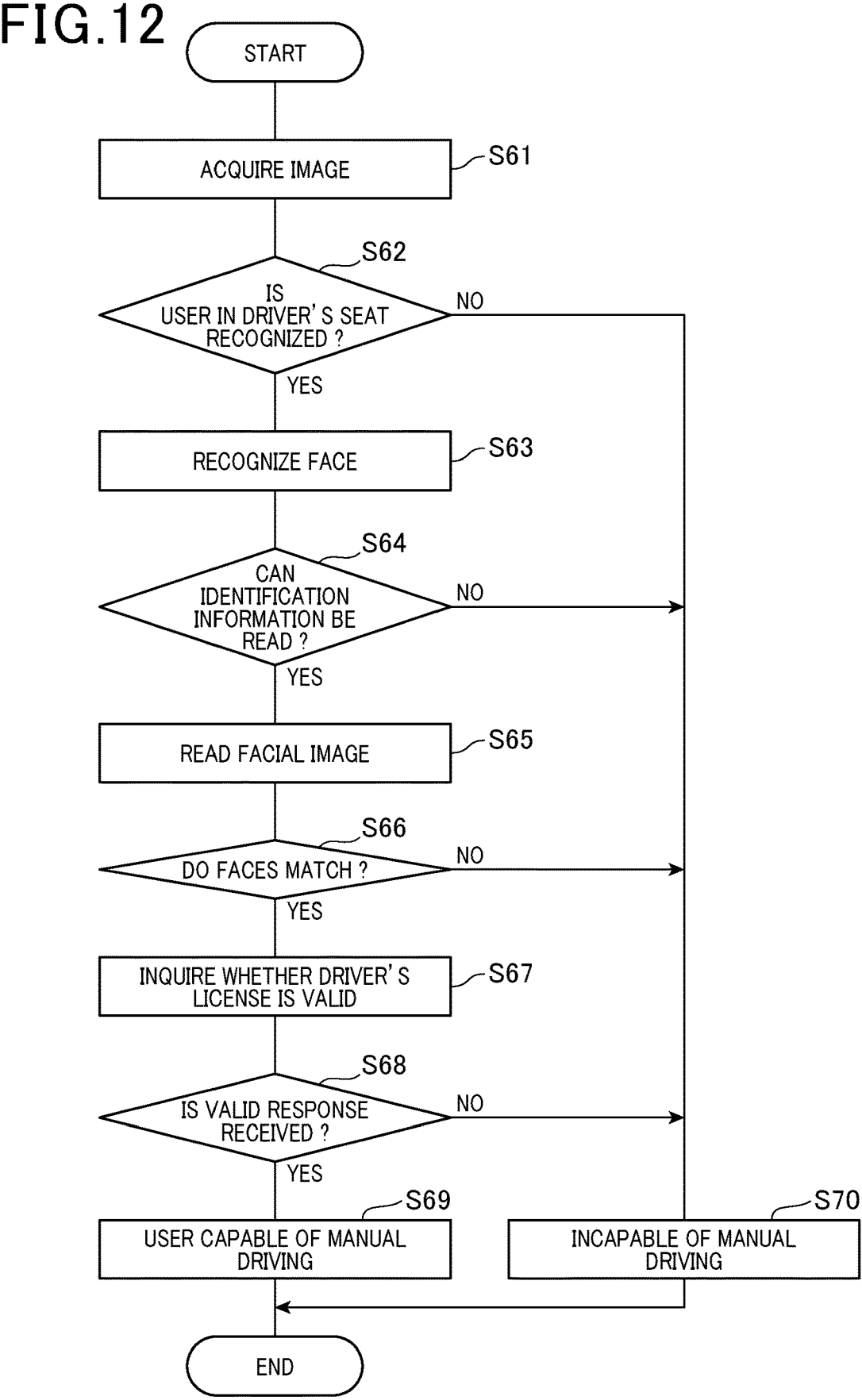
FIG. 12 is a flowchart showing a process for determining whether or not a user is capable of performing manual driving, performed by an automatic traveling control apparatus in the automatic traveling control system according to the third embodiment.

At step S26 shown in FIG. 5, the automatic traveling control apparatus 3 determines, by the driving capability determining unit 27, whether or not the user on hoard the own vehicle is capable of manually driving the own vehicle by a method shown in FIG. 12. First, at step S61 shown in FIG. 12, the automatic traveling control apparatus 3 captures an image of the cabin interior of the own vehicle using the in-cabin camera 45, and acquires an image.

At step S62, the automatic traveling control apparatus 3 determines whether or not a user present in the driver's seat can be recognized in the image acquired at step S61. As a result, when determined that a user present in the driver's seat can be recognized, the automatic traveling control apparatus 3 proceeds to step S63. When determined that a user present in the driver's seat cannot be recognized, the automatic traveling control apparatus 3 proceeds to step S70. The determination of whether or not a user present in the driver's seat can be recognized corresponds to the determination of whether or not the user is present in the position enabling manual driving.

At step S63, the automatic traveling control apparatus 3 recognizes the face of the user present in the driver's seat in the image acquired at step S61. At step S64, the automatic traveling control apparatus 3 determines whether or not the identification information can be read using the driver's license reading apparatus 73. As a result, when determined that the identification information can be read, the automatic traveling control apparatus 3 proceeds to step S65. When determined that the identification information cannot be read, the automatic traveling control apparatus 3 proceeds to step S70. The determination of whether or not the identification information can be read using the driver's license reading apparatus 73 corresponds to the determination of whether or not the user is carrying their driver's license.

At step S65, the automatic traveling control apparatus 3 reads out the facial image associated with the identification information read at step S64 from the database 75. At step S66, the automatic traveling control apparatus 3 determines whether or not the face of the user recognized at step S63 and the facial image read at step S65 match. As a result, when determined that both match, the automatic traveling control apparatus 3 proceeds to step S67. When determined that both do not match, the automatic traveling control apparatus 3 proceeds to step S70. The face of the user and the facial image being a match means that the user carrying the driver's license corresponding to the identification image read using the driver's license reading apparatus 73 is present in the driver's seat.

At step S67, the automatic traveling control apparatus 3 issues an inquiry to the control center 5 regarding whether or not the driver's license corresponding to the identification information read at step S64 is valid. The control center 5 determines whether or not the driver's license corresponding to the identification information for which the inquiry has been issued is valid using the driver's license validity data, and responds to the automatic traveling control apparatus 3 with the determination result.

At step S68, the automatic traveling control apparatus 3 determines whether or not a response (referred to, hereafter, as a valid response) that the driver's license corresponding to the identification information for which the inquiry has been issued at step S67 is valid has been received from the control center 5. As a result, when determined that a valid response has been received, the automatic traveling control apparatus 3 proceeds to step S69. When determined that a valid response has not been received, the automatic traveling control apparatus 3 proceeds to step S70.

At step S69, the automatic traveling control apparatus 3 determines that the user on board the own vehicle is capable of manually driving the own vehicle. At step S70, the automatic traveling control apparatus 3 determines that the user on board the own vehicle is not capable of manually driving the own vehicle.

3. Effects Achieved by the Automatic Traveling Control Apparatus 3 and the Automatic Traveling Control System 1

According to the third embodiment described in detail above, in addition to the above-described effects according to the first embodiment, the following effects are achieved.

(3A) The automatic traveling control apparatus 3 can determine whether or not a user who is carrying a driver's license is in the driver's seat. When a user who is carrying a driver's license is not in the driver's seat, the automatic traveling control apparatus 3 determines that the user on board the own vehicle cannot manually drive the own vehicle. As a result, whether or not the user is capable of manually driving the own vehicle can be appropriately determined.

(3B) The automatic traveling control apparatus 3 determines whether or not the driver's license carried by the user is valid. When the driver's license is not valid, the automatic traveling control apparatus 3 determines that the user on board the own vehicle cannot manually drive the own vehicle. As a result, whether or not the user is capable of manually driving the own vehicle can be appropriately determined. In addition, compliance with traffic laws can be ensured.

<Fourth Embodiment>

Next, a fourth embodiment will be described with reference to FIG. 13 and FIG. 14.

1. Configuration of the Automatic Traveling Control System 1

The configuration of the automatic traveling control system 1 according to the present embodiment is similar to that according to the first embodiment.

2. Processes Performed by the Automatic Traveling Control Apparatus 3 and the Control Center 5

According to the present embodiment, processes performed by the automatic traveling control apparatus 3 and the control center 5 are basically similar to those according to the first embodiment. Therefore, regarding configurations shared with the first embodiment, descriptions thereof are omitted. Differences with the first embodiment will mainly be described.

Figure 13:
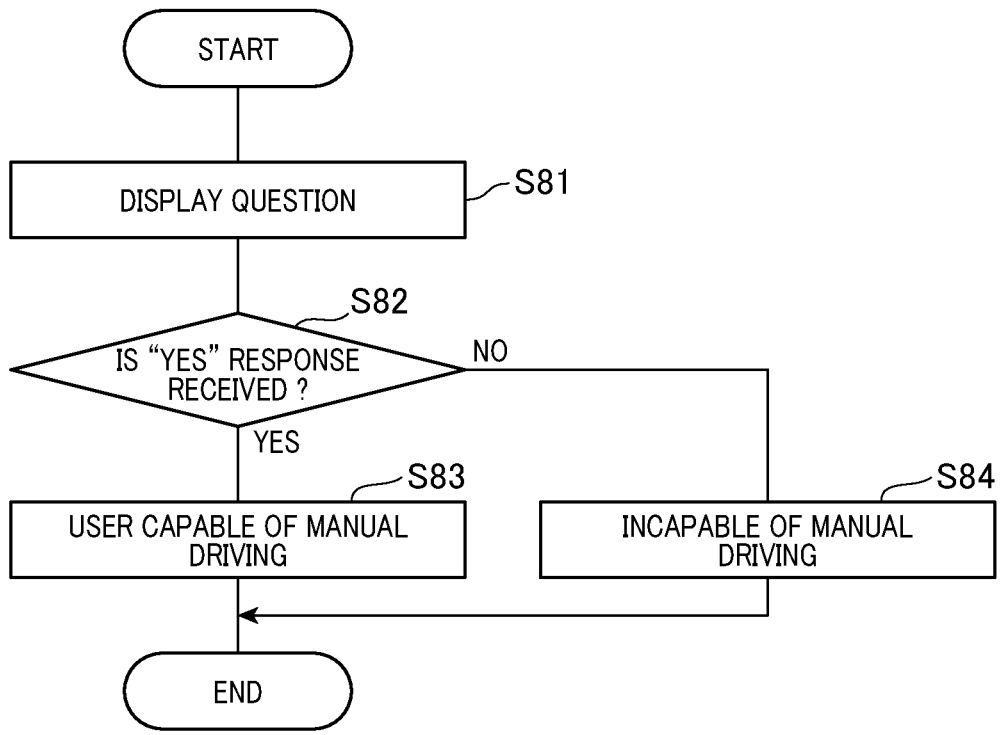
FIG. 13 is a flowchart showing a process for determining whether or not a user is capable of performing manual driving, performed by an automatic traveling control apparatus in an automatic traveling control system according to a fourth embodiment.
Figure 14:
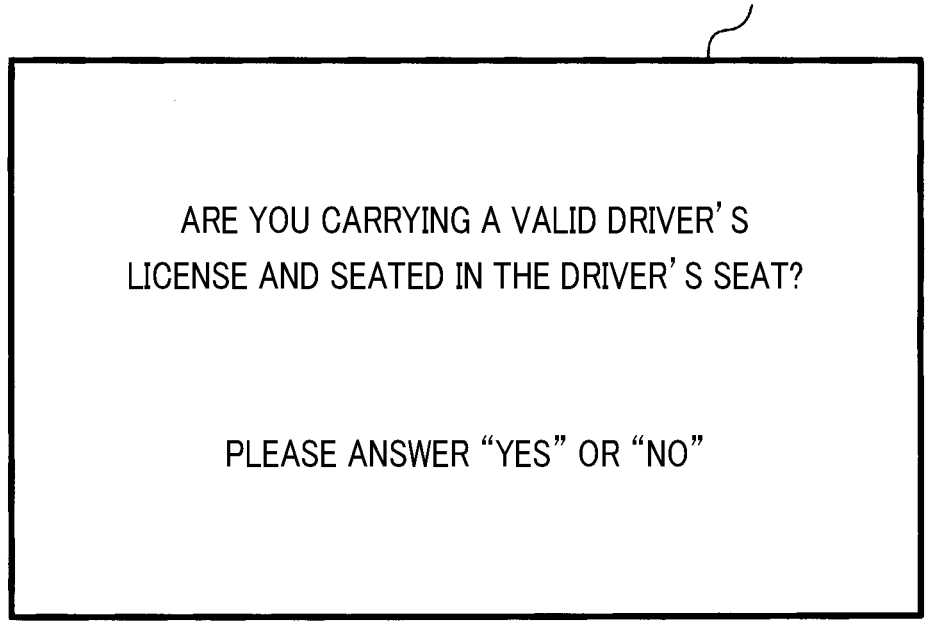
FIG. 14 is an explanatory diagram showing a question displayed on an in-cabin display in the automatic traveling control system according to the fourth embodiment.

At step S26 shown in FIG. 5, the automatic traveling control apparatus 3 determines, by the driving capability determining unit 27, whether or not the user on board the own vehicle is capable of manually driving the own vehicle by a method shown in FIG. 13 and FIG. 14.

In FIG. 13, at step S81, the automatic traveling control apparatus 3 displays a sentence in the form of a question shown in FIG. 14 on the in-cabin display 47. The user can input "yes" or "no" using the input apparatus 53 in response to the question.

At step S82, the automatic traveling control apparatus 3 determines whether or not a "yes" response has been received. When determined that a "yes" response has been received, the automatic traveling control apparatus 3 proceeds to step S83. When determined otherwise, the automatic traveling control apparatus 3 proceeds to step S84. The display of the above-described question at step S81 and the determination of the content of the response to the question at step S82 correspond to the determination of whether or not the user carrying a valid driver's license is present in the driver's seat.

At step S83, the automatic traveling control apparatus 3 determines that the user on board the own vehicle is capable of manually driving the own vehicle. At step S84, the automatic traveling control apparatus 3 determines that the user on board the own vehicle is not capable of manually driving the own vehicle.

3. Effects Achieved by the Automatic Traveling Control Apparatus 3 and the Automatic Traveling Control System 1

According to the fourth embodiment described in detail above, in addition to the above-described effects according to the first embodiment, the following effect is achieved.

(4A) The automatic traveling control apparatus 3 can determine whether or not a user who is carrying a valid driver's license is present in the driver's seat. Then, when a user who is carrying a valid driver's license is not present in the driver's seat, the automatic traveling control apparatus 3 determines that the user on board the own vehicle cannot manually drive the own vehicle. As a result, whether or not the user is capable of manually driving the own vehicle can be appropriately determined. In addition, compliance with traffic laws can be ensured.

<Fifth Embodiment>

Next, a fifth embodiment will be described with reference to FIG. 15.

1. Configuration of the Automatic Traveling Control System 1

The configuration of the automatic traveling control system 1 according to the present embodiment is similar to that according to the third embodiment.

2. Processes Performed by the Automatic Traveling Control Apparatus 3 and the Control Center 5

According to the present embodiment, the processes performed by the automatic traveling control apparatus 3 and the control center 5 are basically similar to those according to the third embodiment or the fourth embodiment. Therefore, regarding configurations shared with the third embodiment or the fourth embodiment, descriptions thereof are omitted. Differences with the third embodiment or the fourth embodiment will mainly be described.

Figure 15:
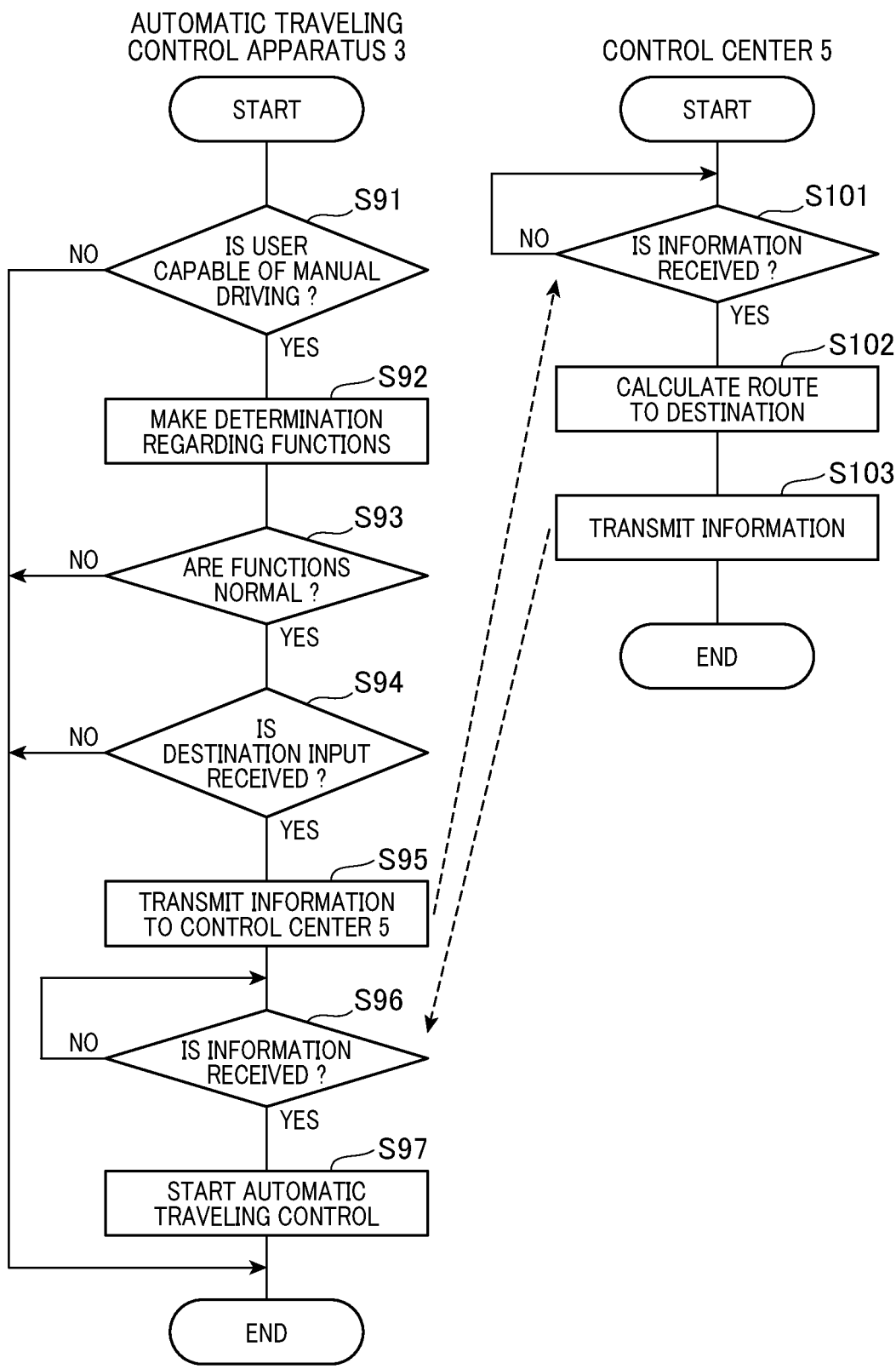
FIG. 15 is a flowchart showing processes performed by an automatic traveling control apparatus and a control center in an automatic traveling control system according to a fifth embodiment.

In addition to the processes according to the third embodiment or the fourth embodiment, the automatic traveling control apparatus 3 and the control center 5 according to the present embodiment can further perform the processes shown in FIG. 15.

(1) Processes on the Automatic Traveling Control Apparatus 3 Side

Of the processes shown in FIG. 15, the processes on the automatic traveling control apparatus 3 side are started when a user who has boarded the own vehicle performs a predetermined operation while the own vehicle is stopped.

At step S91, the automatic traveling control apparatus 3 determines, by the driving capability determining unit 27, whether or not the user on board the own vehicle is capable of manually driving the own vehicle. The determination method is similar to the process at step S26 according to the third embodiment or the fourth embodiment. When determined that the user is capable of manually driving the own vehicle, the automatic traveling control apparatus 3 proceeds to step S92. When determined that the user is incapable of manually driving the own vehicle, the automatic traveling control apparatus 3 ends the present process.

At step S92, the automatic traveling control apparatus 3 determines, by the function determining unit 11, whether or not the functions used for automatic traveling provided by the automatic traveling control apparatus 3 are normal. The determination method is similar to the process at step S21 according to the first embodiment.

At step S93, the automatic traveling control apparatus 3 determines whether or not the determination result of each function at step S92 is normal. When determined that all functions are normal, the automatic traveling control apparatus 3 proceeds to step S94. When determined that even a portion of the functions is abnormal, the automatic traveling control apparatus 3 ends the present process.

At step S94, the automatic traveling control apparatus 3 determines whether or not a destination for automatic traveling is inputted by the input apparatus 53. The user can input the destination using the input apparatus.

At step S95, the automatic traveling control apparatus 3 transmits information to the control center 5. The transmitted information includes the destination determined to be inputted at step S94. In addition, the transmitted information includes a user ID, a current position of the user, a desired arrival time, and the like.

At step S96, the automatic traveling control apparatus 3 determines whether or not the information transmitted by the control center 5 has been received. The received information includes a route from the current location of the own vehicle to the destination. The information is information transmitted by the control center 5 at step S103, described hereafter. As a result, when determined that the information has been received, the automatic traveling control apparatus 3 proceeds to step S97. When determined that the information is not yet received, the automatic traveling control apparatus 3 returns to the process before step S97.

At step S97, the automatic traveling control apparatus 3 starts the automatic traveling control by the automatic traveling control unit 9. The content of the automatic traveling control is similar to step S13 according to the first embodiment. When a negative determination is made at any of steps S91, S93, and S94, the own vehicle is in a state in which manual driving is possible.

(2) Processes on the Control Center 5 Side

At step S101, the calculating unit 57 determines whether or not information transmitted by the automatic traveling control apparatus 3 at step S95 has been received. When determined that the information has been received, the calculating unit 57 proceeds to step S102. When determined that the information is not yet received, the calculating unit 57 returns to the process before step S101.

At S102, the calculating unit 57 calculates the route from the current position of the own vehicle included in the information received at step S101 to the destination included in the information received at step S101. The advanced map information stored in the advanced map information storage unit 65 is used for the calculation.

At step S103, the calculating unit 57 transmits information including the route calculated at step S102 to the automatic traveling control apparatus 3

3. Effects Achieved by the Automatic Traveling Control Apparatus 3 and the Control Center 5

According to the fifth embodiment described in detail above, the above-described effects according to the first embodiment are achieved. In addition, the effects according to the third embodiment or the fourth embodiment are achieved. Furthermore, according to the fifth embodiment, the following effects are achieved.

(5A) The automatic traveling control apparatus 3 starts the automatic traveling control with a requisite condition being that the user is capable of performing manual driving. Therefore, after the start of automatic traveling control, should the continuation of automatic traveling control not be possible for some reason, switching to manual driving can be performed. As a result, safety of the own vehicle is improved.

(5B) The automatic traveling control apparatus 3 can determine whether or not a user who is carrying a valid driver's license is present in the driver's seat. In addition, when a user who is carrying a valid driver's license is not present in the driver's seat, the automatic traveling control is not started. As a result, safety of the own vehicle is further improved. In addition, compliance with traffic laws can be ensured.

4. Aspects Corresponding to the Fifth Embodiment

The fifth embodiment corresponds to the following aspects.

(Aspect A) An automatic traveling control apparatus including: an automatic traveling control unit that makes an own vehicle automatically travel on a route to a destination; a function determining unit that determines whether or not functions used for automatic traveling are normal; a driving capability determining unit that determines whether or not a user on board the own vehicle is capable of manually driving the own vehicle; and a prohibiting unit that prohibits automatic traveling by the automatic traveling control unit when the function determining unit determines that the functions are not normal or when the driving capability determining unit determines that the user cannot perform manual driving.

(Aspect B) The automatic traveling control apparatus described in Aspect A, in which the automatic traveling control apparatus further includes a route generating unit that generates the route to the destination of the own vehicle.

(Aspect C) The automatic traveling control apparatus described in Aspect A or B, in which the driving capability determining unit includes a driver's license determining unit that determines whether or not the user holds a driver's license, and determines that the user is capable of manually driving the own vehicle when the user holds a driver's license.

(Aspect D) The automatic traveling control apparatus described in Aspect C, in which the driver's license determining unit is configured to determine whether or not the user is carrying a driver's license, and the driving capability determining unit determines that the user is capable of manually driving the own vehicle when the user is carrying a driver's license.

(Aspect E) The automatic traveling control apparatus described in Aspect C, in which the driver's license determining unit is configured to determine whether or not the user holds a valid driver's license, and the driving capability determining unit determines that the user is capable of manually driving the own vehicle when the user holds a valid driver's license.

(Aspect F) The automatic traveling control apparatus described in Aspect A or B, in which the driving capability determining unit includes a user position determining unit that determines whether or not the user is present in a position enabling manual driving, and determines that the user is capable of manually driving the own vehicle when the user is present in the position enabling manual driving.

<Other Embodiments>

The embodiments of the present disclosure are described above. However, the present disclosure is not limited to the above-described embodiments. For example, various embodiments such as those below are possible.

(1) The driving capability determining unit 27 may include a body examining unit that examines the body of the user onboard the own vehicle. Whether or not the user is capable of manually driving the own vehicle may be determined based on the examination result from the body examining unit. For example, the body examining unit can capture an image of the face of the user with a camera and, from the image (in particular, the areas of the eyes, eyelids, and eyebrows), detect drowsiness of the user by a publicly known method. In this case, when a drowsiness level is equal to or less than a predetermined threshold, the user can be determined to be capable of manually driving the own vehicle. When the drowsiness level exceeds the threshold, the user can be determined to be incapable of manually driving the own vehicle.

In addition, the body examining unit may be that which detects body information, such as blood pressure, heart rate, pulse wave, body temperature, or eyesight of the user. In this case, when the detected body information is within a normal range set in advance, the user can be determined to be capable of manually driving the own vehicle. When the detected body information is outside of the normal range, the user can be determined to be incapable of manually driving the own vehicle.

(2) Instead of the control center 5 or in addition to the control center 5, the automatic traveling control system 1 may include a road-side installation apparatus that provides similar functions. The road-side installation apparatus can acquire information, such as the user ID, the current position of the user, the destination, the desired arrival time, and the number of passengers, from an external source by wireless communication.

(3) Instead of the control center 5 or in addition to the control center 5, the automatic traveling control system 1 may include an onboard apparatus that provides similar functions. In this case, the onboard apparatus and the automatic traveling control apparatus 3 are capable of performing communication by inter-vehicle communication. The onboard apparatus can acquire information, such as the user ID, the current position of the user, the destination, the desired arrival time, and the number of passengers, from an external source by wireless communication. In addition, a passenger of a vehicle in which the onboard apparatus is mounted may input the foregoing information.

(4) According to the first embodiment, when a negative determination is made at step S26 or step S28, the route for automatic traveling may be reset. For example, the route after resetting can be a route from the position of the own vehicle at this time to a position at which the own vehicle can safely stop. The position at which the own vehicle can safely stop can be stored in advance in the advanced map information of the advanced map information storage unit 43 and used when the route is reset.

When the function state notification becomes normal during automatic traveling along the route after resetting, automatic traveling may be performed along the original route. In addition, when automatic traveling is performed along the route after resetting and the function state notification becomes normal after arrival at the position enabling safe stopping, automatic traveling may be performed along the original route.

(5) According to the first embodiment, when a negative determination is made at step S26 or step S28, traveling may be performed at a lower speed than that during ordinary automatic traveling control, along the original route. During traveling at a lower speed, the operator of the control center 5 may remotely operate the own vehicle.

(6) The automatic traveling control apparatus 3 may provide a function in which, when the function state notification is determined to be abnormal, notification that the own vehicle will stop is given to peripheral vehicles, two-wheeled vehicles, pedestrians, and the like. Subsequently, the own vehicle is immediately stopped, taking into consideration the safety of the vehicles and the like in the periphery. For example, the notification can be given by sound, light, or characters.

(7) The automatic traveling control apparatus 3 may further provide a function in which, when the function state notification is determined to be abnormal, the own vehicle tracks another vehicle that is automatically traveling to the same destination, and automatically travels to the destination.

(8) The automatic traveling control apparatus 3 may further provide a function in which, when the function state notification is determined to be abnormal, traffic lights in the periphery of the own vehicle are controlled using the control center 5, and other vehicles are prevented from approaching the own vehicle.

(9) Assignment of functions related to automatic traveling between the automatic traveling control apparatus 3 and the control center 5 can be set as appropriate. For example, the user ID, the current position of the user, the destination, the desired arrival time, and the number of passengers may be transmitted from the control center 5 to the automatic traveling control apparatus 3. The automatic traveling control apparatus 3 may then calculate the route to the destination. The advanced map information stored in the advanced map information storage unit 43 can be used for the calculation of the route.

In addition, when the route is reset as in above-described (4), the control center 5 may perform the resetting of the route. For example, the automatic traveling control apparatus 3 transmits a reset request and the position of the own vehicle at this time to the control center 5. The control center 5 then resets a route from the position of the own vehicle to a position at which the own vehicle can safely stop. In this case, the position at which the own vehicle can safely stop can be stored in advance in the advanced map information of the advanced map information storage apparatus 65 and used for resetting.

(10) The notifications performed by the second notifying unit 17 and the third notifying unit 25 may be either of the notification by audio and the notification by display of an image. Furthermore, in addition to, or instead of, the notification by audio or the notification by display of an image, another mode of notification (such as notification by vibrations, scent, temperature change, or wind) may be given.

The behavior of the user that can be detected by the behavior detecting unit 23 of the automatic traveling control apparatus 3 may be behavior other than the in-cabin display 47 being struck. For example, a section other than the in-cabin display 47 may be struck, the in-cabin display 47 may be touched, the in-cabin display 47 may be grasped and shaken, or the user may sound a specific keyword (such as "malfunction," "abnormality," or "display has disappeared").

(12) According to the third embodiment, whether or not the user is present in the driver's seat may be determined through use of a detection result from a seat sensor provided in the driver's seat.

(13) According to the third embodiment, the user may be identified by a fingerprint of the user. In this case, the own vehicle includes a fingerprint reading apparatus near the driver's seat. The database 75 stores therein the fingerprint and the identification information of the driver's license in association. The driving capability determining unit 27 reads the fingerprint of the user using the fingerprint reading apparatus. In addition, the driving capability determining unit 27 reads the identification information using the driver's license reading apparatus. When the fingerprint read by the fingerprint reading apparatus and the fingerprint associated with the identification of the driver's license match, the driving capability determining unit 27 determines that the user carrying the driver's license is present in the driver's seat.

(14) A function provided by a single constituent element according to the above-described embodiment may be dispersed among a plurality of constituent elements. Functions provided by a plurality of constituent elements may be integrated into a single constituent element. In addition, at least a part of a configuration according to the above-described embodiment may be replaced by a publicly known configuration providing similar functions. Furthermore, a part of a configuration according to the above-described embodiment may be omitted. Moreover, at least a part of a configuration according to an above-described embodiment may be added to or replace a configuration according to another above-described embodiment. All aspects included in the technical concept identified solely by the expressions recited in the scope of claims are embodiments of the present invention.

(15) The present invention can also be actualized by various modes, such as a program enabling a computer to function as the automatic traveling control apparatus 3, a medium on which the program is recorded, and an automatic traveling control method.

The invention claimed is:

1. An automatic traveling control apparatus for performing automatic traveling of an own vehicle, the automatic traveling control apparatus comprising:
   an automatic traveling control unit that controls, using a processor, the own vehicle to perform the automatic traveling;
   a function determining unit that determines, using the processor, whether a state of function for performing the automatic traveling is normal;
   a first notifying unit that generates, using the processor, a notification of the state of function for performing the automatic traveling, and outputs the generated notification to a first notifying device provided in the own vehicle;
   an abnormality detecting unit that detects, using the processor, an abnormality of a state of at least one of the first notifying unit and the first notifying device in the notification of the state of function for performing the automatic traveling; and
   a second notifying unit that generates, using the processor, a predetermined characteristic notification in response to the abnormality detecting unit detecting the abnormality of the state of at least one of the first notifying unit and the first notifying device in the notification of the state of function for performing the automatic traveling and the function determining unit determining that the state of function for performing the automatic traveling is normal, and outputs the generated characteristic notification to a second notifying device provided in the own vehicle.

2. The automatic traveling control apparatus according to claim 1, further comprising:
   an input signal acquiring unit that acquires, using the processor, an input signal from an input apparatus that receives an input operation by a user; and
   an own vehicle operating unit that operates, using the processor, the own vehicle during automatic traveling, based on the input signal.

3. The automatic traveling control apparatus according to claim 1, further comprising:
   a behavior detecting unit that detects, using the processor, a specific behavior by the user; and
   a third notifying unit that generates, using the processor, the predetermined characteristic notification in response to the specific behavior being detected.

4. The automatic traveling control apparatus according to claim 1, wherein:
   the automatic traveling control unit controls the own vehicle to automatically travel using advanced map information.

5. The automatic traveling control apparatus according to claim 1, further comprising:
   a driving capability determining unit that determines, using the processor, whether or not the user on board the own vehicle is capable of manually driving the own vehicle; and
   a manual driving requesting unit that gives, using the processor, a notification requesting manual driving by the user, in response to the second notifying unit generating the predetermined characteristic notification and the driving capability determining unit determining that the user is capable of manually driving the own vehicle.

6. The automatic traveling control apparatus according to claim 5, wherein:
   the driving capability determining unit includes a body examining unit that examines the body of the user, and determines whether the user is capable of manually driving the own vehicle based on an examination result by the body examining unit.

7. The automatic traveling control apparatus according to claim 5, wherein:
   the driving capability determining unit includes a driver's license determining unit that determines whether the user holds a driver's license, and determines that the user is capable of manually driving the own vehicle in response to the user holding a driver's license.

8. The automatic traveling control apparatus according to claim 7, wherein:
the driver's license determining unit is configured to determine whether the user is carrying a driver's license; and
the driving capability determining unit determines that the user is capable of manually driving the own vehicle in response to the user is carrying a driver's license.

9. The automatic traveling control apparatus according to claim 7, wherein:
the driver's license determining unit is configured to determine whether the user holds a valid driver's license; and
the driving capability determining unit determines that the user is capable of manually driving the own vehicle in response to the user holding a valid driver's license.

10. The automatic traveling control apparatus according to claim 5, wherein:
the driving capability determining unit includes a user position determining unit that determines whether or not the user is present in a position enabling manual driving of the own vehicle, and determines that the user is capable of manually driving the own vehicle in response to the user being present in the position enabling manual driving of the own vehicle.

11. The automatic traveling control apparatus according to claim 5, further comprising:
a continuation notifying unit that generates, using the processor, a notification of a continuation of automatic traveling in at least one of a case in which manual driving is not started after the manual driving requesting unit requests manual driving by the user, and a case in which the driving capability determining unit determines that the user is incapable of manually driving the own vehicle.

12. An automatic traveling control system for performing automatic traveling of an own vehicle, the automatic traveling control system comprising:
an automatic traveling control apparatus comprising:
an automatic traveling control unit that controls, using a processor, the own vehicle to perform the automatic traveling;
a function determining unit that determines, using the processor, whether a state of function for performing the automatic traveling is normal;
a first notifying unit that generates, using the processor, a notification of the state of function for performing the automatic traveling, and outputs the generated notification to a first notifying device provided in the own vehicle;
an abnormality detecting unit that detects, using the processor, an abnormality of a state of at least one of the first notifying unit and the first notifying device in the notification of the state of function for performing the automatic traveling; and
a second notifying unit that generates, using the processor, a predetermined characteristic notification in response to the abnormality detecting unit detecting the abnormality of the state of at least one of the first notifying unit and the first notifying device in the notification of the state of function for performing the automatic traveling and the function determining unit determining that the state of function for performing the automatic traveling is normal, and outputs the generated characteristic notification to a second notifying device provided in the own vehicle; and
a function providing unit that provides, using a processor, the automatic traveling control apparatus with at least a portion of functions for controlling automatic traveling.

13. The automatic traveling control system according to claim 12, wherein:
the function providing unit comprises a road-side installation apparatus that controls automatic traveling within a specific area.

14. The automatic traveling control system according to claim 13, wherein:
the function providing unit comprises a center-type apparatus that controls automatic driving within a specific area and is monitored by an operator.

15. The automatic traveling control system according to claim 12, wherein:
the function providing unit comprises an onboard apparatus that is mounted in a vehicle and is capable of communicating with the automatic traveling control apparatus by inter-vehicle communication.

16. The automatic traveling control apparatus according to claim 1, wherein:
the abnormality in the notification of the state of function for performing the automatic traveling is determined based on functioning of a vehicle user interface.

17. A method for performing automatic traveling of an own vehicle, the method comprising:
controlling the own vehicle to perform the automatic traveling;
determining whether a state of function for performing the automatic traveling is normal;
generating a notification of the state of function for performing the automatic traveling and outputting the generated notification to a first notifying device provided in the own vehicle;
detecting an abnormality of a state of at least one of the first notifying unit and the first notifying device in the notification of the state of function for performing the automatic traveling; and
generating a predetermined characteristic notification in response to detecting the abnormality of the state of at least one of the first notifying unit and the first notifying device in the notification of the state of function for performing the automatic traveling and determining that the state of function for performing the automatic traveling is normal, and outputting the generated characteristic notification to a second notifying device provided in the own vehicle.

* * * * *